3,432,436
HALOGENATED FLUIDS

Donald H. Nail, Los Angeles, Calif., assignor, by mesne assignments, to McDonnell Douglas Corporation, Santa Monica, Calif., a corporation of Maryland
No Drawing. Filed Jan. 24, 1966, Ser. No. 522,369
U.S. Cl. 252—78                    9 Claims
Int. Cl. C09k 3/28, 3/02

ABSTRACT OF THE DISCLOSURE

Fire resistant fluid composition, useful as hydraulic fluids, compressor lubricants, and heat transfer fluids, having a wide liquid range comprising a chlorinated diphenyl ether and a chlorinated biphenyl.

---

This invention relates to new compositions in the form of blends of fluids having desirable properties rendering them useful for a variety of functional fluid applications, and the invention is particularly concerned with compositions having high fire resistance and wide liquid range, in the form of a mixture of certain halogenated organic compounds having utility as air compressor lubricants, industrial and aircraft hydraulic fluids, and heat transfer fluids, and which also can be incorporated with other hydraulic fluid and lubricant base stock components, such as phosphates, for the production of hydraulic fluids of high fire resistance, wide liquid range, reduced viscosity at low temperatures, and good lubricity.

Various fluids have been developed heretofore having various combinations of properties required for hydraulic fluids employed for a variety of purposes. However, for many purposes highly fire resistant hydraulic fluids and lubricants are required. Thus, for example, fire resistant and explosion resistant fluids are particularly useful in high pressure systems such as in the hydraulic systems of die casting machines, hydro electric turbines, hydraulic presses, and the like, which would result in fire and explosion from leaking hydraulic fluids in the event such fluids are not adequately fire resistant.

In U.S. Patent 3,136,726 there is described a fire resistant hydraulic fluid and lubricant comprising a mixture of certain phosphate esters, e.g., a triaryl phosphate such as tricresyl phosphate, and a chlorinated biphenyl, and which may also contain viscosity improvers such as a polyalkyl methacrylate. Although these mixtures provide excellent fire resistant and explosion-proof hydraulic fluids and lubricants, they have limited application at temperatures of the order of about 0° F. and below, because of their relatively high viscosity characteristics and tendency to crystallize out or form solids at such reduced temperatures.

In my copending application Ser. No. 408,753, filed Nov. 4, 1964, there is described an improved fire resistant hydraulic fluid and lubricant having improved low temperature characteristics, comprising a mixture of certain phosphate esters, e.g., a triaryl phosphate, and a chlorinated diphenyl ether.

I have now found that mixtures or blends of a chlorinated diphenyl ether with a chlorinated biphenyl, provide versatile and useful fire resistant compositions having utility as hydraulic fluids, lubricants and heat transfer media. These mixtures have good physical and chemical stability, good thermal and hydrolytic stability, and of particular note, such mixtures have high fire resistance and at the same time can be controlled with respect to degree of chlorination and relative proportions of the chlorinated diphenyl ether and chlorinated biphenyl components, to provide optimum properties of low viscosity and low pour point at reduced temperatures, and wide liquid range.

The use of a combination of chlorinated diphenyl ether and chlorinated biphenyl in fluid compositions of the invention, have marked advantages over the use of a chlorinated biphenyl alone or a chlorinated diphenyl ether alone. Thus, mixtures or blends of the chlorinated diphenyl ether and chlorinated biphenyl generally have a substantially lower viscosity than the corresponding chlorinated biphenyls of equivalent chlorine content. Although the chlorinated diphenyl ethers or chlorinated diphenyl oxides, often contain high melting constituents which tend to separate out as solids at relatively low temperatures, e.g., room temperature, this tendency is unexpectedly retarded in mixtures of chlorinated biphenyl and chlorinated diphenyl ether, so that useful fluids can be formulated according to the invention. Thus, the resulting fluids of the invention have lower viscosity, a greater degree of fire resistance for a given chlorine content of chlorinated diphenyl ether and of chlorinated biphenyl, and a wider dependable liquid range than a fluid containing the same proportion of chlorinated biphenyl of comparable chlorine content employed alone, or a fluid containing a corresponding proportion of chlorinated diphenyl ether of corresponding chlorine content, employed alone.

Thus, fluid formulations of the invention containing a combination of chlorinated diphenyl ether and chlorinated biphenyl can be provided having extremely high fire resistance on the one hand, and, for example, where it is necessary to provide fluids of good viscosity at low temperature which can flow readily, e.g., as a compressor lubricant on a cold day, invention fluids can be formulated or tailored to solve such problem, or at a given viscosity to provide fluids with improved fire resistance.

Suitable chlorinated diphenyl ethers which can be employed in the invention composition or fluid can include from about 1 to about 10 chlorine atoms in the molecule, generally from about 1 to about 6 chlorine atoms per molecule. In each instance, the mono-, di-, tri-, tetra-, penta, and hexa-chloro derivatives of the diphenyl ether according to the invention, consist primarily or substantially entirely of substitution chlorine on the aromatic rings, rather than addition chlorine, and in each case the ether used can be either a particularly selected isomer or compound, or mixture of isomers, or an unresolved mixture of isomers or mixture of chlorinated diphenyl ethers of varying numbers of chlorine atoms in the molecule. Such mixtures of chlorinated diphenyl ethers are obtained from the reaction of chlorine with diphenyl ether, e.g., as described in U.S. Patents 2,022,632 and 2,165,813.

Compositions of the invention particularly having reduced viscosity are prepared employing chlorinated diphenyl ethers preferably having from about 1 to about 4 chlorine atoms per molecule. In some instances where it is particularly desired to provide compositions according to the invention which are useful as low viscosity coolants, such compositions are prepared using as a chlorinated diphenyl ether component a mixture which can also include, for example, some unchlorinated diphenyl ether as well as, for example, monochloro and dichloro diphenyl ethers. For general purpose wide utility, mixtures of chlorinated diphenyl ethers averaging, for example, about 4 chlorine atoms per molecule can be employed. Thus, for example, the term "tetrachloro diphenyl ether" employed herein refers to either the specific tetrachlorinated derivative or a mixture of chlorinated diphenyl ethers which averages approximately 4 chlorine atoms per molecule and consisting of mixtures of the various isomer molecules chlorinated to varying degrees.

The combined chlorine content of the preferred chlorinated diphenyl ethers employed in the invention composition can range from about 15 to about 59% by weight, encompassing such ethers which contain from about 1 to about 6 chlorine atoms, preferably from about 15 to about 50% corresponding to such ethers containing the preferred about 1 to about 4 chlorine atoms. The combined chlorine content of the mixture of chlorinated diphenyl ethers containing an average of about 4 chlorine atoms per molecule can range from about 45 to about 50% by weight.

The chlorinated biphenyls suitable for use in the fluid composition of the invention are those which contain from about 1 to about 5 chlorine atoms per molecule. Here also, as in the case of the chlorinated diphenyl ether component, the respective mono-, di-, tri-, tetra-, and pentachloro derivatives of biphenyl according to the invention, consist primarily or substantially entirely of substitution chlorine on the aromatic rings, rather than addition chlorine, and in each case the chlorinated biphenyl employed can be either a particularly selected isomer or compound, or mixture of isomers, or an unresolved mixture of isomers or mixture of chlorinated biphenyls of varying numbers of chlorine atoms in the molecule. Thus, for example, the term "tetrachloro biphenyl" employed herein refers to either the specific tetrachlorinated derivative or a mixture of chlorinated biphenyls which averages approximately 4 chlorine atoms per molecule and consisting of mixtures of the various isomer molecules chlorinated to varying degrees. Such chlorinated biphenyls can be obtained by the reaction of chlorine with biphenyl, in a manner known in the art. Preferred biphenyls for use in the fluids of the invention are those having from about 3 to about 5 chlorine atoms per molecule.

The combined chlorine content of the chlorinated biphenyls containing from about 1 to about 5 chlorine atoms can range from about 18 to about 55%. The preferred chlorinated biphenyls containing from about 3 to about 5 chlorine atoms are those having from about 40 to about 55% combined chlorine. Suitable chlorinated biphenyls are available in the trade; for example, they are made and sold under the trademark designation "Aroclor." In terms of the trademark designation, Aroclor 1242, Aroclor 1248, and Aroclor 1254 are preferred for the compositions of this invention. These Aroclor chlorinated biphenyls contain about 42%, 48% and 54% by weight of combined chlorine, respectively, and also correspond approximately to the tri-, tetra-, and penta-chlorobiphenyls, respectively.

The proportions of chlorinated diphenyl ether and chlorinated biphenyl in the formulations of the invention can be varied widely. Generally, such mixtures can contain from about 10 to about 90% by weight of a chlorinated diphenyl ether and about 90 to about 10% by weight of a chlorinated biphenyl. However, in preferred practice, the proportions of such components range from about 30 to about 70% chlorinated diphenyl ether and about 70 to about 30% of chlorinated biphenyl, by weight.

As described and claimed in my copending application Ser. No. 522,415, filed of even date herewith, particularly useful hydraulic fluids and lubricants having high fire resistance, wide liquid range, low viscosity at low temperature and good lubricity can be formulated by incorporating the mixtures or blends of chlorinated diphenyl ether and chlorinated biphenyl, according to the invention, with phosphate esters. Phosphate esters with which the mixtures of chlorinated diphenyl ether and chlorinated biphenyl of the invention can be incorporated are the trialkyl phosphates, triaryl phosphates, diarylalkyl phosphates and dialkylaryl phosphates. Examples of such phosphate esters are tri-n-butyl phosphate, tri(2-ethylhexyl) phosphate, tricresyl phosphate, cresyl diphenyl phosphate, triphenyl phosphate, dihexyl phenyl phosphate, butyl diphenyl phosphate, butyl-2-ethylhexyl phenyl phosphate, di-(2-ethylhexyl) phenyl phosphate, and the like. Tricresyl phosphate and cresyl diphenyl phosphate are preferred.

The proportion of phosphate ester to the sum or to the blend of the chlorinated diphenyl ether and chlorinated biphenyl components can vary widely, e.g., over a range of about 20 to about 80% of phosphate ester and about 80 to about 20% of the sum of the two chlorinated components, by weight. Such three component fluid compositions should contain at least 10% of the chlorinated diphenyl ether and at least 10% of the chlorinated biphenyl. In preferred practice, useful three component fluids of this type are obtained employing about 30% to about 70% phosphate ester or a mixture of phosphate esters, and about 70 to about 30% by weight of the sum of the two chlorinated components.

Viscosity index improvers can be incorporated in the invention compositions, although not necessarily. Thus, to a mixture of the two chlorinated components, or to a mixture of phosphate ester and the two chlorinated components, can be added suitable polyalkyl methacrylates, e.g., those marketed as "Acryloid." These materials have varying molecular weight and viscosity. In general, the polymerized alkyl methacrylates suitable for use in the invention composition or fluid contain from about 2 to about 18, preferably about 4 to about 10, carbon atoms in the alkyl group, and have a molecular weight within the range of about 2,000 to about 20,000 and an average molecular weight within the range of about 3,000 to about 15,000. Usually a minor proportion, e.g., about 0.2 to about 10% by weight, of such polyalkyl methacrylate is employed.

The following are examples of practice of the invention:

EXAMPLE 1

The following are blends or mixtures of chlorinated diphenyl ethers and chlorinated biphenyls according to the invention:

Table I

Percent by weight (1)

| | |
|---|---|
| Monochlorodiphenyl ether | 50 |
| Pentachlorobiphenyl | 50 |

(2)

| | |
|---|---|
| Tetrachlorodiphenyl ether | 50 |
| Tetrachlorobiphenyl | 50 |

(3)

| | |
|---|---|
| Pentachlorodiphenyl ether | 50 |
| Pentachlorobiphenyl | 50 |

(4)

| | |
|---|---|
| Tetrachlorodiphenyl ether | 50 |
| Pentachlorobiphenyl | 50 |

(5)

| | |
|---|---|
| Hexachlorodiphenyl ether | 50 |
| Tetrachlorobiphenyl | 50 |

(6)

| | |
|---|---|
| Trichlorodiphenyl ether | 30 |
| Pentachlorobiphenyl | 70 |

(7)

| | |
|---|---|
| Trichlorodiphenyl ether | 30 |
| Tetrachlorobiphenyl | 70 |

(8)

| | |
|---|---|
| Tetrachlorodiphenyl ether | 33 |
| Pentachlorobiphenyl | 33 |
| Pentachlorodiphenyl ether | 34 |

Blends 1 to 8 above are illustrative of the large number of blends or formulations of fluid compositions according to the invention which can be formulated. The formulations of higher chlorine content are particularly highly fire resistant and the compositions of lower chlorine content tend toward lower viscosity at decreased temperatures. Composition 8 illustrates formulations which contain more than one component of the class of chlorinated diphenyl ethers. Blends of this type are desirable to provide greater versatility in achieving the liquid range and viscosity required in a particular case.

Fluid formulations corresponding to Compositions 1 to 8 of Table I above can be used as hydraulic fluids or lubricants in industrial air compressors, hydraulic presses, hydroelectric turbines, and the like.

EXAMPLE 2

The following are additional examples of fire resistant fluid formulations according to the invention:

Table II

Percent by weight (9)

| | |
|---|---|
| Dichlorodiphenyl ether | 60 |
| Tetrachlorobiphenyl | 40 |

(10)

| | |
|---|---|
| Tetrachlorodiphenyl ether | 75 |
| Trichlorobiphenyl | 25 |

(11)

| | |
|---|---|
| Pentachlorodiphenyl ether | 33 |
| Tetrachlorobiphenyl | 67 |

(12)

| | |
|---|---|
| Pentachlorodiphenyl ether | 55 |
| Pentachlorobiphenyl | 33 |
| Tetrachlorobiphenyl | 12 |

(13)

| | |
|---|---|
| Tetrachlorodiphenyl ether | 75 |
| Tetrachlorobiphenyl | 25 |

(14)

| | |
|---|---|
| Hexachlorodiphenyl ether | 55 |
| Tetrachlorobiphenyl | 45 |

(15)

| | |
|---|---|
| Trichlorodiphenyl ether | 58 |
| Tetrachlorobiphenyl | 42 |

The above formulations 9 to 15 of Table II further illustrate various blends of chlorinated diphenyl ethers and chlorinated biphenyls which can be provided according to the invention.

Here again, the relative fire resistance, liquid range and viscosity characteristics at low temperature will vary chiefly in relation to the degree of chlorination of the chlorodiphenyl ether and chlorobiphenyl components and the relative proportions of these components with respect to each other. All of these formulations have utility as industrial hydraulic fluids for use in hydraulic presses and turbines, and as industrial lubricants, for example, in compressors, and the like.

EXAMPLE 3

The following are examples illustrating incorporation of the blends of chlorinated diphenyl ethers and chlorinated biphenyls according to the invention, into phosphates for production of hydraulic fluids and lubricants, as described in my above copending application.

Table III

Percent by weight (16)

| | |
|---|---|
| Monochlorodiphenyl ether | 25 |
| Pentachlorobiphenyl | 25 |
| Tricresyl phosphate | 50 |

(17)

| | |
|---|---|
| Tetrachlorodiphenyl ether | 25 |
| Tetrachlorobiphenyl | 25 |
| Tricresyl phosphate | 50 |

(18)

| | |
|---|---|
| Pentachlorodiphenyl ether | 25 |
| Pentachlorobiphenyl | 25 |
| Tricresyl phosphate | 50 |

(19)

| | |
|---|---|
| Tetrachlorodiphenyl ether | 25 |
| Pentachlorobiphenyl | 25 |
| Tricresyl phosphate | 50 |

(20)

| | |
|---|---|
| Hexachlorodiphenyl ether | 25 |
| Tetrachlorobiphenyl | 25 |
| Tricresyl phosphate | 50 |

Blends 16 to 20 above have varying properties of fire resistance and reduced viscosity at decreased temperatures. Desired formulations of the type illustrated in 16 to 20 above can be selected to provide the proper balance of fire resistance, liquid range, viscosity and pour point at low temperatures, and lubricity for the particular application. Such fluids can be employed as hydraulic fluids or lubricants in industrial air compressors and hydraulic presses.

From the foregoing, it is seen that the invention provides novel and improved fluid compositions particularly useful as hydraulic fluids, lubricants, coolants and the like. Mixtures according to the invention have the following characteristics.

(1) High fire resistance, particularly where the chlorinated diphenyl ether and chlorinated biphenyl contain about 40% chlorine or more by weight.

(2) Good to excellent thermal stability.

(3) Good to excellent oxidative stability.

(4) Good lubricity.

(5) Wide liquid range with relatively low pour point and cloud point.

(6) Improved viscosity at low temperature of the order of 0° F. and below.

(7) Compatibility with metals used in construction of hydraulic systems operating over wide temperature ranges.

(8) The fluids of the invention are versatile and relative proportions of the components can be selected and varied to achieve the properties desired for the intended application.

While I have described particular embodiments of my invention for the purpose of illustration, it should be understood that various modifications and adaptations thereof may be made within the spirit of the invention, as set forth in the appended claims.

I claim:

1. A composition consisting essentially of a mixture of about 10 to about 90% by weight of a chlorinated diphenyl ether and about 90 to about 10% by weight of a chlorinated biphenyl, said chlorinated diphenyl ether having a combined chlorine content of from about 15% to about 59% by weight, said chlorinated biphenyl having a combined chlorine content of from about 18% to about 55% by weight.

2. A composition as defined in claim 1, said chlorinated diphenyl ether being present in an amount of about 30 to about 70% by weight, and said chlorinated biphenyl being present in an amount of about 70 to about 30% by weight.

3. A composition as defined in claim 1, wherein said chlorinated diphenyl ether comprises a chlorinated diphenyl ether containing in the range from about 1 to about 6 chlorine atoms per molecule and said chlorinated biphenyl comprises a chlorinated biphenyl containing in the range from about 1 to about 5 chlorine atoms per molecule.

4. A composition as defined in claim 1, wherein said chlorinated diphenyl ether comprises a chlorinated diphenyl ether containing in the range from about 1 to about 4 chlorine atoms per molecule and said chlorinated biphenyl comprises a chlorinated biphenyl containing in the range from about 3 to about 5 chlorine atoms per molecule.

5. A fire resistant fluid composition as defined in claim 3, said chlorinated diphenyl ether comprising a mixture of chlorinated diphenyl ethers.

6. A fire resistant fluid composition as defined in claim 3, said chlorinated biphenyl comprising a mixture of chlorinated biphenyls.

7. A fire resistant fluid composition as defined in claim 3, said chlorinated diphenyl ether comprising a mixture of chlorinated diphenyl ethers, said chlorinated biphenyl comprising a mixture of chlorinated biphenyls.

8. A fire resistant fluid composition as defined in claim 2, wherein said chlorinated diphenyl ether comprises a chlorinated diphenyl ether containing in the range from about 1 to about 4 chlorine atoms per molecule and said chlorinated biphenyl comprises a chlorinated biphenyl containing in the range from about 3 to about 5 chlorine atoms per molecule, said chlorinated diphenyl ether having a combined chlorine content of about 15 to about 50% by weight, and said chlorinated biphenyl having a combined chlorine content of about 40 to about 55% by weight.

9. A fire resistant fluid composition as defined in claim 1, wherein said chlorinated diphenyl ether and said chlorinated biphenyl each contains an average of about 4 chlorine atoms per molecule.

References Cited

UNITED STATES PATENTS 3,136,726  6/1964  Moreton _____ 252—78 X

FOREIGN PATENTS 1,327,189  4/1963  France.

LEON D. ROSDOL, *Primary Examiner.*

STANLEY D. SCHWARTZ, *Assistant Examiner.*

U.S. Cl. X.R.

252—49.6